United States Patent [19]

West et al.

[11] 4,088,055
[45] May 9, 1978

[54] ARMING DEVICE

[76] Inventors: William F. West, 12077 Kalua Dr., Sunland, Calif. 91040; Curtis V. Correll, Sr., 1900 Bonita Dr., Glendale, Calif. 91208

[21] Appl. No.: 755,541

[22] Filed: Dec. 29, 1976

[51] Int. Cl.² ............................ F41F 5/02; B64D 1/04
[52] U.S. Cl. ................................... 89/1.5 D; 102/2; 294/83 R
[58] Field of Search ............... 89/1.5 D, 1.5 E; 102/2; 294/83 R, 83 A, 83 AA

[56] References Cited

U.S. PATENT DOCUMENTS

| | | | |
|---|---|---|---|
| 2,845,003 | 7/1958 | Thomas | 89/1.5 D |
| 2,891,447 | 6/1959 | Buecker | 89/1.5 D |
| 2,897,414 | 7/1959 | Thomas | 89/1.5 D X |
| 2,922,340 | 1/1960 | Wilkie | 89/1.5 D |
| 3,200,707 | 8/1965 | West | 89/1.5 D |
| 3,831,486 | 8/1974 | Yost | 89/1.5 D |
| 3,939,754 | 2/1976 | Dexter | 89/1.5 D |
| 3,998,124 | 12/1976 | Milhous et al. | 89/1.5 D |

*Primary Examiner*—David H. Brown
*Attorney, Agent, or Firm*—Fulwider, Patton, Rieber, Lee & Utecht

[57] ABSTRACT

An arming device for selectively causing a bomb or other munition to be discharged in a safe or an armed condition, the device having a rotatable detent mechanism with a slot in which a loop on the end of an arming wire is releasably secured. When the munition is to be released in a safe condition, the detent mechanism allows the loop to be pulled from the slot by a force insufficient for arming the munition, but a solenoid can be energized to prevent operation of the detent mechanism, thereby permitting the munition to be armed. The rotatability of the detent mechanism causes it to be aligned with the direction of pull on the arming wire, preventing the loop from binding against the sides of the slot and arming a munition when the solenoid is not energized. The solenoid is oriented horizontally so that it is not responsive to abrupt vertical movements.

18 Claims, 4 Drawing Figures

U.S. Patent
May 9, 1978
4,088,055
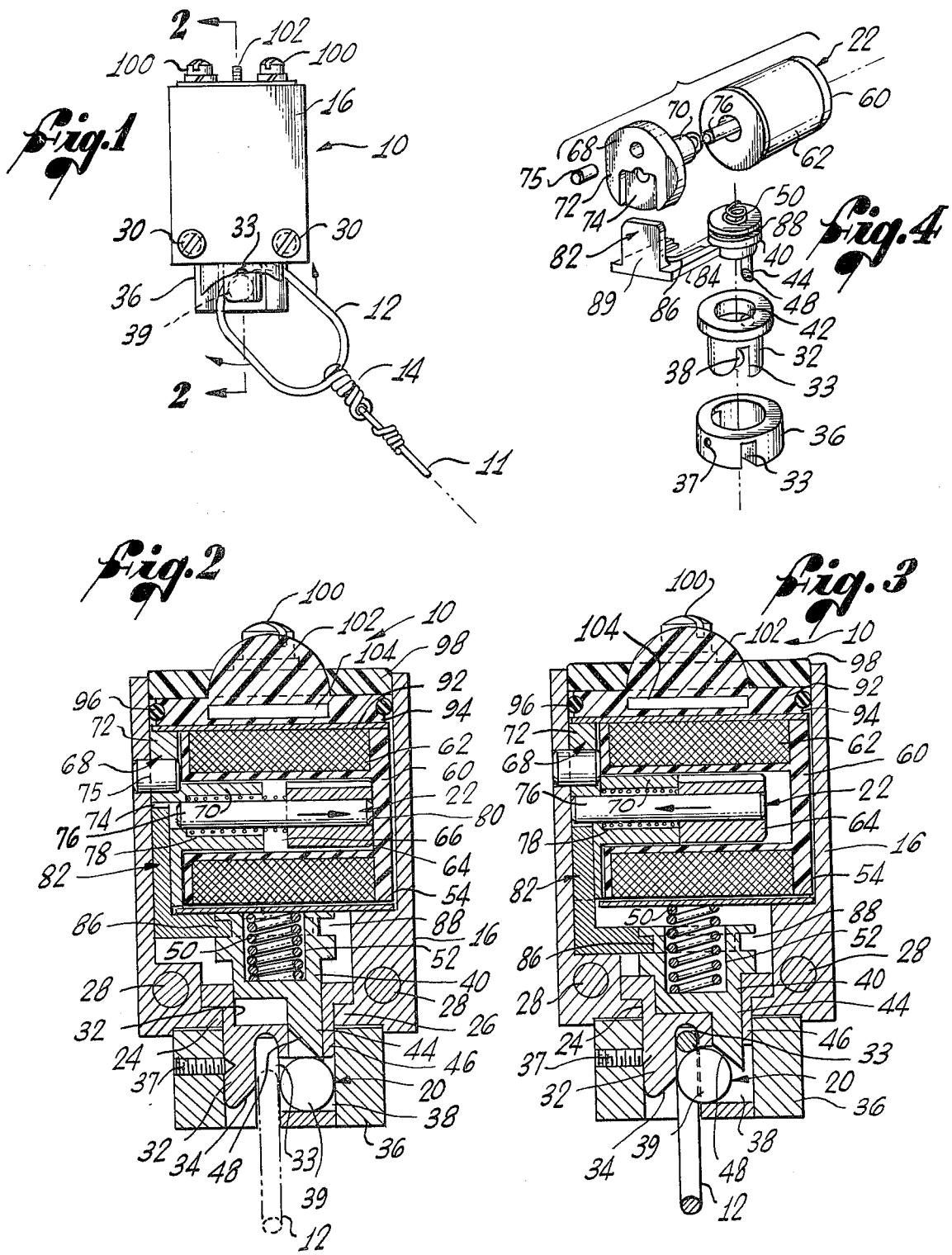

ARMING DEVICE

BACKGROUND OF THE INVENTION

The present invention relates to arming devices, and more particularly to devices that releasably retain the arming wires of bombs and other types of munitions, and can be energized electrically to cause the munition to be armed when released.

Bombs and other munitions are normally carried in a "safe" condition in which they will not detonate even if released from a bomb rack or otherwise discharged. To arm the munition, a substantial pulling force on an arming wire is required. In the case of a bomb, the arming wire is attached to the carrying aircraft and played out by the bomb as it falls away. After the bomb is clear of the aircraft it can be armed by a force exerted by the wire.

The arming wire is attached to the aircraft or other carrier by an arming device, which, in its normal non-energized state, holds the wire against the forces of gravity, acceleration and wind, but releases the wire at a tension insufficient to arm the munition. When electrically energized, however, the arming device secures the arming wire in a non-releasable manner so that the munition can be discharged in an armed condition. The arming device ensures that any munition unintentionally discharged will remain in a safe condition and permits the munition to be intentionally discharged in a safe condition, as when it is desired to unload munitions prior to a landing.

According to most military specifications in effect today, a typical arming device in an unenergized condition should release the arming wire at a predetermined force of 10 to 14 pounds. In an energized condition, it must hold the arming wire against a force of at least 150 pounds, but substantially higher holding forces may be required.

It is conventional to provide the arming wire with a loop attached to one end by a swivel. The loop is usually inserted in a slot in the arming device where it is retained, often by a ball or conical detent. The slot is parallel to the front-to-back axis of the aircraft, and the loop can swing within the plane of the slot to accommodate relative movement of a discharged munition. It has been found, however, that munitions are sometimes unintentionally discharged in an armed condition, although the arming device is not energized. It is believed by the present inventors that such unintended arming sometimes occurs because the slot does not permit the loop to pivot from side-to-side in response to a significant component of motion transversely of the aircraft, causing the loop to bind within the slot and exert a force on the arming wire sufficient to arm the munition.

Another problem associated with conventional arming device relates to the solenoid which is commonly used to prevent the release of the arming wire when energized. Abrupt vertical movements of the aircraft, and vertical shock occasioned by the release of other munitions can produce conditions that cause relative movement of the solenoid armature changing the effective condition of the device or causing it to jam.

A principal objective of the present invention is to provide an arming device that is multi-directional, i.e., will not bind due to transverse movement of the munition after it is discharged. Another principal objective is to provide such an arming device that is not sensitive to vertical shocks or abrupt vertical movements of an aircraft.

SUMMARY OF THE INVENTION

The present invention comprises an arming device in which a mechanism that engages an arming wire is rotatable to align itself with the direction of pull on the wire, preventing binding of the wire that might cause a munition to be armed unintentionally. The device includes a solenoid that provides retention of the arming wire, thereby arming the munition, when in an energized condition. The solenoid is not sensitive to vertical shock or abrupt vertical movements because it is oriented horizontally.

More specifically, the arming device retains the arming wire by a detent mechanism that includes a retaining sleeve rotatably mounted in a housing, the sleeve having a slot in which a loop on the end of the wire is inserted. When the munition is discharged, the sleeve rotates to a position in which the slot is aligned with the direction of pull on the wire. The loop is normally retained in the slot by a ball detent movable within a horizontal channel, the ball being positioned by a plunger having a cam face that engages the ball through a bore in the sleeve. When the munition is dropped in a safe condition, the ball moves along the channel out of engagement with the loop by pushing against the cam face and lifting the plunger against the bias of a relatively light spring.

When it is desired to drop a munition in an armed condition, operation of the detent mechanism to release the loop is prevented by the solenoid which is located above the plunger. When the solenoid is energized, an armature moves a pin horizontally into a position in which it prevents upward travel of a blocking member. A yoke that is part of the blocking member engages the plunger so that the plunger is free to rotate but cannot move vertically unless the blocking member moves with it. Therefore, the protrusion of the pin, when the solenoid is energized, prevents the plunger cam face from moving upwardly to permit the ball to release the loop, and the resulting force exerted on the arming wire arms the munition.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 1 is a front view of an exemplary arming device that embodies the present invention;

FIGS. 2 and 3 are cross-sectional views of the arming device taken along the line 2—2 and showing the device in safe and armed conditions, respectively; and FIG. 4 is an exploded view of the detent mechanism and solenoid of the arming device.

DESCRIPTION OF THE PREFERRED EMBODIMENT

An exemplary arming device 10, embodying the present invention and illustrated in the accompanying drawings, is intended to be mounted on the bomb rack (not shown) of an aircraft. The rack holds a bomb or other type of munition (not shown) that is equipped with an arming wire 11 having a loop 12 attached to one end by a swivel 14. The loop 12 is held by the arming device 10, as shown in FIG. 1, but, with the device in its normal non-energized condition, the loop can be disengaged by a relatively small force insufficient to arm the bomb. When it is desired to drop the bomb in an armed condition, the arming device 10 is energized, causing it to resist disengagement of the loop 12 at a pulling force sufficient to arm the bomb.

In general, the arming device 10 comprises a housing 16 which supports a detent mechanism 20 that releasably secures the wire 11, and a solenoid 22 that can be energized to prevent operation of the detent mechanism and retain the wire. The housing 16 is generally rectangular and box-like, having a circular opening 24 centered in its bottom wall 26 and two parallel mounting holes 28 at its lower end through which it can be attached to the bomb rack by fasteners 30.

The detent mechanism 20, illustrated in FIG. 4, includes a cylindrical sleeve 32 rotatably seated in the opening 24 at the bottom of the housing 16. The sleeve has a vertical slot 33 that extends across its lower end, the loop 12 being inserted upwardly into the slot 33. The sleeve 32 is cut away to form a bevel 34 along one lower edge of the slot 33 which facilitates insertion of the loop 12. A collar 36 surrounds the sleeve 32 and is anchored to the sleeve for rotation therewith by a set screw 37. The slot 34 extends outwardly from the sleeve 32 through the collar 35.

To releasably secure the loop 12 within the slot 33, a cylindrical horizontal ball channel 38 extends radially, perpendicular to the slot and opens to the outside of the sleeve 32. A ball detent 39 is loosely received within the ball channel 38, and, when in its normal position shown in FIG. 3, projects from the channel into the slot 33. The loop 12 cannot be removed unless the ball 39 moves outwardly along the channel 38 toward the radially outward end thereof that is closed and sealed against dirt by the collar 36. The sleeve 32 and the ball 39 thus form the ball engaging members of the detent mechanism 20.

The ball 39 is biased toward this normal loop-retaining position by a plunger 40 that can reciprocate vertically within a cylindrical socket 42 sunk in the top of the sleeve 32. A vertical projection 44 on the bottom of the plunger 40 extends downwardly through a small off-center bore 46 in the sleeve 32 into the ball channel 38, and an inclined cam face 48 on the lower end of the projection engages the outside top surface of the ball 39 so that outward movement of the ball along the channel 38 pushes the plunger upwardly, as shown in FIG. 2. The projection 44 interlocks the sleeve 32 and the plunger 40 for joint rotation.

The plunger 40 is urged downwardly to bias the ball 39 toward its loop-retaining position by a compression spring 50 seated in a recess 52 in the top of the plunger. By substituting a heavier or lighter spring 50, the pulling force at which the loop 12 is released can be varied. Upward movement of the spring 50 is prevented by a plate 54 disposed horizontally across the housing 16.

The ability of the detent mechanism 20, including the sleeve 32 and the plunger 40, to rotate within the housing 16 is of great importance when a bomb is to be dropped in a safe condition. While the loop 12 on the arming wire 11 can swing freely through an angle of about 180 degrees from one horizontal position to another within the plane of the slot 33 and about a horizontal axis passing through the ball 39, it cannot move outside the plane of the slot. If the sleeve 32 and slot 33 had a fixed position relative to the aircraft, it would be possible for a bomb with a significant component of motion transversely of the slot to cause the loop 12 to bind against the sides of the slot, and the resistance offered by the loop could be large enough to unintentionally arm the bomb. The rotatability of the sleeve 32, however, allows the slot 33 to be aligned with the direction of the pull of the wire 11, thereby preventing the bomb from becoming armed unless the operation of the detent mechanism is intentionally blocked by energizing the arming device as explained below.

The solenoid 22 that can be energized to prevent upward movement of the plunger 40, thereby locking the ball 39 in its loop-retaining position to arm the bomb, includes a spool 60 disposed horizontally above the plate 54, a winding 62 on the spool, and an armature 64 axially movable in a horizontal bore 66 in the spool. A bushing 68 disposed at one end of the spool 60 includes an annular projection 70 that extends into the bore 66 so that the end of the projection serves as a stop to limit the travel of the armature 64. The bushing 68 also has a generally disk-shaped end portion 72 disposed along one side of the housing 16 that defines a rectangular channel 74 extending downwardly from the end of the bore 66 to an opening at its lower end. A positioning pin 75 that projects through an opening in the housing 16 prevents movement of the bushing 68.

A core pin 76 is inserted in the armature 64 and extends through the annular projection 70. An armature spring 78 encircles the pin 76 and biases the armature 64 against a closed end 80 of the bore 66 farthest from the bushing 68. When the solenoid is energized, the armature is driven toward the bushing 68, against the bias of the spring 78 causing the end of the pin 76 to project into the channel 74. A blocking member 82 prevents upward movement of the plunger 40 when the pin 76 is in this loop retaining position (shown in FIG. 3); in other words, the energized solenoid 22 and the blocking member 82 cooperate to cause retention of the arming wire 11 by the detent mechanism 20.

The blocking member 82 includes a horizontal yoke 84 that extends across the housing 16 and engages the top of the plunger 40. Within the yoke 84 is a flange 86 that is received by a circumferential groove 88 in the plunger 40 so that the plunger can rotate within the yoke but the plunger and blocking member 82 are locked together for joint vertical movement. The blocking member 82 also includes an upright portion 89 perpendicular to the yoke 84 that rides in the channel 74 of the bushing 68. The blocking member 82 and plunger 40 thus form a locking mechanism that prevents the ball 39 from releasing the loop 12 when the solenoid 22 is energized.

When the solenoid winding 62 is energized, the projection of the pin 76 into the channel 74 prevents the blocking member 82 from moving upwardly. With the cam face 48 thus held in its downward loop-retaining position, the ball 39 cannot move along the ball channel 38 to disengage the loop 12. In this way, the energization of the solenoid 22 causes the detent mechanism 20 to retain the wire 11 with sufficient force to arm the bomb. Upon de-energization of the solenoid 22, the armature spring 78 retracts the pin 76 from the channel 74, as shown in FIG. 2, so that the detent mechanism 20 can release the wire 11 and allow the bomb to be dropped in a safe condition. The detent mechanism 20, blocking member 82 and pin 76 can be made of high strength steel if it is desired that the device 10 withstand higher arming forces such as those of approximately 600 pounds or more.

The top of the housing 16 is closed by a thin metal top plate 92 positioned horizontally above the spool 60 and a cover 94 above the top plate. The perimeter of the cover 94 is sealed against the sides of the housing 16 by an O-ring 96, and a layer of potting material 98 is solidified on top of the cover. Two electrical terminals 100 project above the potting layer 98 and are connected by lead wires (not shown) to the winding 62 of the solenoid 22. To prevent cross-wiring, an upstanding guard plate 102, integrally formed with the cover 94, projects through the potting layer 98 between the terminals 100. An electrical transient suppressing device, such as diode 104, is contained by the cover 94 and connected between the lead wires. A current limiting device, such as a fuse, may be included is series with the suppressor to prevent electrical failure of the device from affecting other related electrical equipment.

It will be appreciated from the foregoing that the present invention provides a highly reliable arming device 10 of relatively simple construction that is easily manufactured. The rotatability of the retaining sleeve 32 and the plunger 40 renders the device 10 multi-directional while the horizontal orientation of the solenoid 22 prevents unintended operation in reponse to abrupt vertical movements.

While a particular form of the invention has been illustrated and described, it will be apparent that various modifications can be made without departing from the spirit and scope of the invention.

We claim:

1. A multi-directional arming device for releasably retaining a loop on the end of an arming wire comprising:
   a housing;
   a retaining sleeve engaged by said housing and rotatable about a vertical axis, said sleeve having a slot for receiving said loop, a horizontal ball channel opening into said slot, a centrally located cylindrical socket, and an off-center bore connecting said socket to said ball channel;
   a plunger vertically reciprocable within said socket and having a projection with an inclined cam face on its lower end extending downwardly through said bore;
   resilient means for downwardly biasing said plunger;
   a ball movably disposed within said channel and urged by said cam face into a loop-retaining position;
   a vertically reciprocable yoke within said housing including means for slidably engaging said plunger to connect said yoke to said plunger for vertical movement therewith while permitting rotation of said plunger relative to said yoke;
   a vertically extending blocking element integrally formed with said yoke;
   a horizontally movable pin;
   armature means for moving said pin from a first position permitting vertical movement of said blocking element to a second position blocking vertical movement of said blocking element; and
   spring means for biasing said pin toward said first position;
   whereby said ball can move from said loop-retaining position to a loop-releasing position by lifting said plunger, yoke and blocking element against the force of said resilient means when said pin is in said second position but not when said pin is in said first position.

2. A multi-directional arming device for selectively allowing a munition to be discharged in a safe condition or an armed condition comprising:
   a housing;
   detent means rotatably mounted in said housing for releasably holding an arming wire, whereby said detent means can assume a position aligned with the direction of pull of said arming wire; and
   retention means for selectively preventing operation of said detent means to prevent release of said arming wire, said wire retention means including an electrically energizable solenoid non-rotatably mounted within said housing.

3. The arming device of claim 2, wherein said detent means is capable of unlimited rotation.

4. The arming device of claim 2, wherein said detent means includes a retaining sleeve having a slot therein for the insertion of a loop on the end of said arming wire.

5. The arming device of claim 4, wherein said detent means further includes a spring, a plunger biased by said spring and reciprocally movable within said retaining sleeve, said plunger having an inclined cam face thereon, and a ball urged by said cam face toward a position in which it engages said loop.

6. The arming device of claim 2, wherein said solenoid includes a winding and an armature movable within said winding, said detent means being rotatable about an axis perpendicular to the direction of movement of said armature within said winding.

7. The arming device of claim 6, wherein said detent means includes a plunger reciprocable and rotatable within said housing, and said retention means includes a blocking member rotatably engaging said plunger and reciprocable therewith, said armature preventing reciprocation of said blocking member when said solenoid is in an energized position.

8. The arming device of claim 7, wherein said wire retention means includes a pin attached to said armature and engageable with said blocking member by which said armature prevents reciprocation of said blocking member when said solenoid is in an energized condition.

9. An arming device for selectively allowing a munition to be discharged in an armed or safe condition comprising:
   a housing;
   a plurality of arming wire engaging members rotatably disposed within said housing to releasably receive an arming wire, at least one of said engaging members being movable relative to another of said engaging members to release said wire in a safe condition;
   a solenoid non-rotatably mounted in said housing and having an energized condition and a de-energized condition; and
   locking means for preventing said relative movement of said wire engaging members and thereby permitting armed release of said munition when said solenoid is in said energized condition.

10. The arming device of claim 9, wherein said solenoid includes a winding and an armature movable within said winding, said wire engaging members being rotatable about an axis perpendicular to the direction of movement of said armature within said winding.

11. The arming device of claim 9, wherein said locking means is reciprocable within said housing.

12. The arming device of claim 9, wherein said locking means is reciprocable within said housing along an axis perpendicular to the axis of rotation of said wire engaging members.

13. The arming device of claim 9, wherein said locking means includes a blocking member engageable with said solenoid, said blocking member being reciprocable with said housing in a direction parallel to the axis of rotation of said wire engaging members.

14. The arming device of claim 9, wherein said locking means comprises:
   a plunger engaging one of said wire engaging members and a blocking member engaging said solenoid means, said plunger being rotatably engaged by said blocking member.

15. The arming device of claim 9, wherein said wire engaging elements comprise:
   a retaining sleeve engaged by said housing, said sleeve having a slot for receiving said wire and a ball channel opening into said slot; and
   a ball movably disposed within said channel between a first position in which it prevents withdrawal of said wire from said slot and a second position in which it permits withdrawal of said wire from said slot.

16. The arming device of claim 15 wherein said locking means comprises a plunger having an inclined cam face engageable with said ball and a blocking member rotatably engaging said plunger and engageable with said solenoid.

17. The arming device of claim 16 further comprising resilient means engaging said plunger and thereby urging said ball toward said first position.

18. The arming device of claim 16, wherein said retaining sleeve has a bore therein communicating with said ball channel, said plunger having a projection thereon extending into said bore and reciprocable therein.

* * * * *